US009720526B2

(12) United States Patent
Yeh

(10) Patent No.: US 9,720,526 B2
(45) Date of Patent: Aug. 1, 2017

(54) ACTIVE STYLUS WITH SWITCHING FUNCTIONS

(71) Applicant: EGalax_eMPIA Technology Inc., Taipei (TW)

(72) Inventor: Shang-Tai Yeh, Taipei (TW)

(73) Assignee: eGalax_eMPIA Technology Inc., Taipei (TW)

(*) Notice: Subject to any disclaimer, the term of this patent is extended or adjusted under 35 U.S.C. 154(b) by 182 days.

(21) Appl. No.: 14/598,716

(22) Filed: Jan. 16, 2015

(65) Prior Publication Data

US 2015/0205390 A1 Jul. 23, 2015

Related U.S. Application Data

(60) Provisional application No. 61/928,881, filed on Jan. 17, 2014.

(51) Int. Cl.
*G06F 3/038* (2013.01)
*G06F 3/041* (2006.01)
*G06F 3/0354* (2013.01)

(52) U.S. Cl.
CPC ........ *G06F 3/0383* (2013.01); *G06F 3/03545* (2013.01); *G06F 3/041* (2013.01)

(58) Field of Classification Search
CPC .... G06F 3/0383; G06F 3/03545; G06F 3/041; G06F 3/0354; G06F 3/033; G06F 3/0386; G06F 3/038; G06F 3/03; G06F 3/01; G06F 3/00; G06F 3/03542; G06F 3/037; G06F 15/0208; B43K 8/003; B43K 8/22; B43K 29/00; B43K 29/08; B43K 29/20; B43K 29/093; B43K 29/10; B43K 29/003

USPC .......................................................... 345/179
See application file for complete search history.

(56) References Cited

U.S. PATENT DOCUMENTS

| | | | | |
|---|---|---|---|---|
| 5,405,208 A * | 4/1995 | Hsieh | ..................... | B43K 29/10 362/118 |
| 5,541,375 A * | 7/1996 | Dam | ................... | G06F 3/03545 178/19.01 |
| 5,790,100 A * | 8/1998 | Kikinis | ................. | G06F 1/1616 345/15 |
| 6,326,956 B1 * | 12/2001 | Jaeger | ................... | G06F 3/0317 178/19.05 |

(Continued)

FOREIGN PATENT DOCUMENTS

JP 2008129683 A * 6/2008

*Primary Examiner* — Julie Anne Watko
(74) *Attorney, Agent, or Firm* — Muncy, Geissler, Olds & Lowe, P.C.

(57) ABSTRACT

An active stylus without function keys is disclosed to include a pen body defining therein an accommodation chamber, a control device mounted inside the accommodation chamber and including a circuit board capable of outputting a signal to a touch control device of a touch screen being touched by the active stylus and two first conductors electrically connected to the circuit board, and a rotating barrel rotatably mounted on the pen body around the control device, the rotating barrel including a second conductor movable with the rotating barrel relative to the pen body into contact with either or both of the two first conductors or away from the first conductors to provide one of a series of signals for driving circuit board to output a corresponding control signal to the touch control device of the touch screen.

6 Claims, 23 Drawing Sheets

(56) References Cited

U.S. PATENT DOCUMENTS

| | | | | |
|---|---|---|---|---|
| 6,533,483 | B2* | 3/2003 | Carroll | B43K 8/003 |
| | | | | 401/194 |
| 7,926,968 | B2* | 4/2011 | Liu | B43K 24/084 |
| | | | | 362/109 |
| 8,226,315 | B1* | 7/2012 | McKinley | B43K 24/06 |
| | | | | 401/195 |
| 9,383,839 | B1* | 7/2016 | Rost | G06F 3/03545 |
| 2008/0192006 | A1* | 8/2008 | Lapstun | G06F 3/03545 |
| | | | | 345/158 |
| 2011/0096044 | A1* | 4/2011 | Raif | G06F 3/03545 |
| | | | | 345/179 |
| 2012/0086675 | A1* | 4/2012 | Raif | G06F 3/03545 |
| | | | | 345/179 |
| 2013/0135220 | A1* | 5/2013 | Alameh | G06F 3/041 |
| | | | | 345/173 |
| 2013/0335380 | A1* | 12/2013 | Griffin | G06F 3/03545 |
| | | | | 345/179 |
| 2014/0125606 | A1* | 5/2014 | Namkung | G06F 1/1656 |
| | | | | 345/173 |
| 2014/0253461 | A1* | 9/2014 | Hicks | G06F 1/3215 |
| | | | | 345/173 |
| 2014/0253468 | A1* | 9/2014 | Havilio | G06F 3/03545 |
| | | | | 345/173 |
| 2015/0205383 | A1* | 7/2015 | Chang | G06F 3/0383 |
| | | | | 345/179 |

* cited by examiner

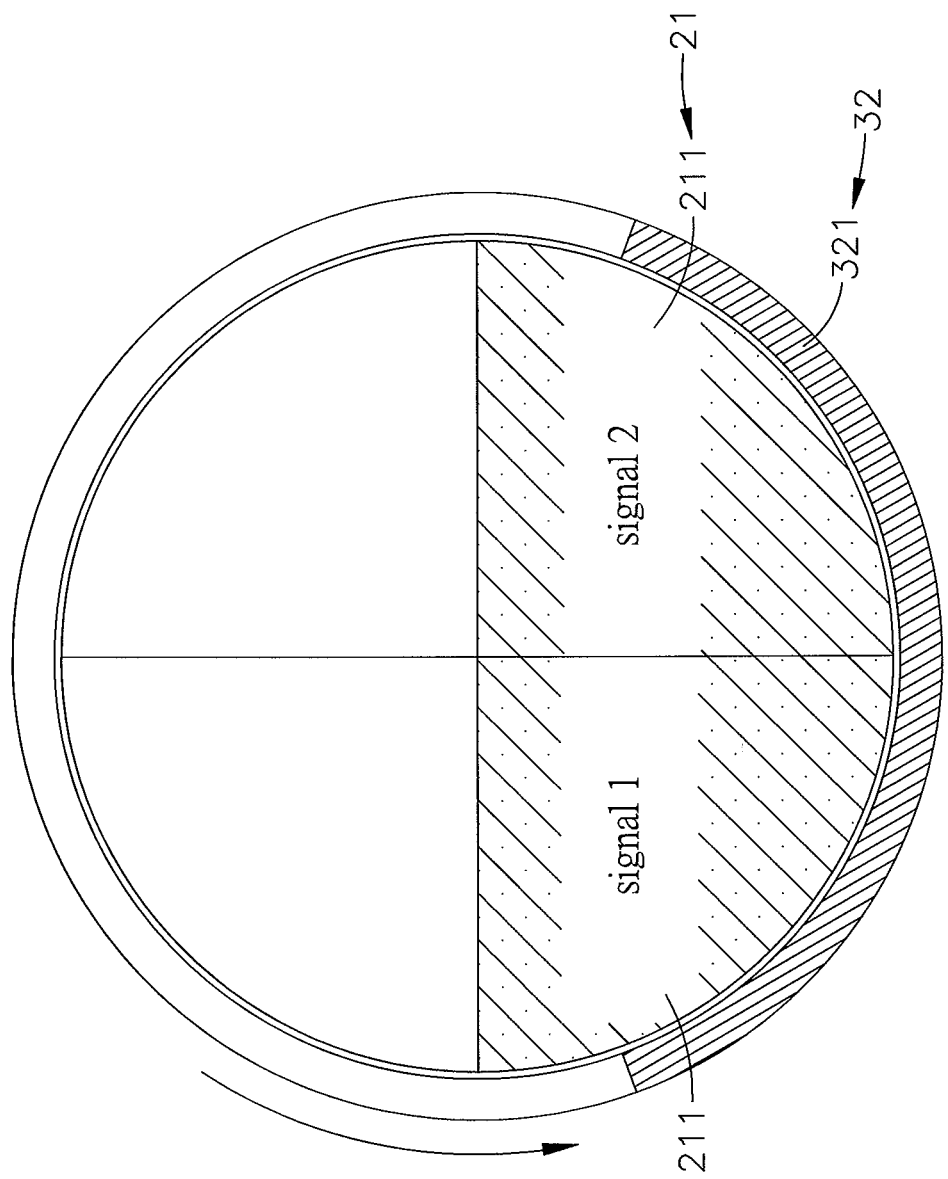

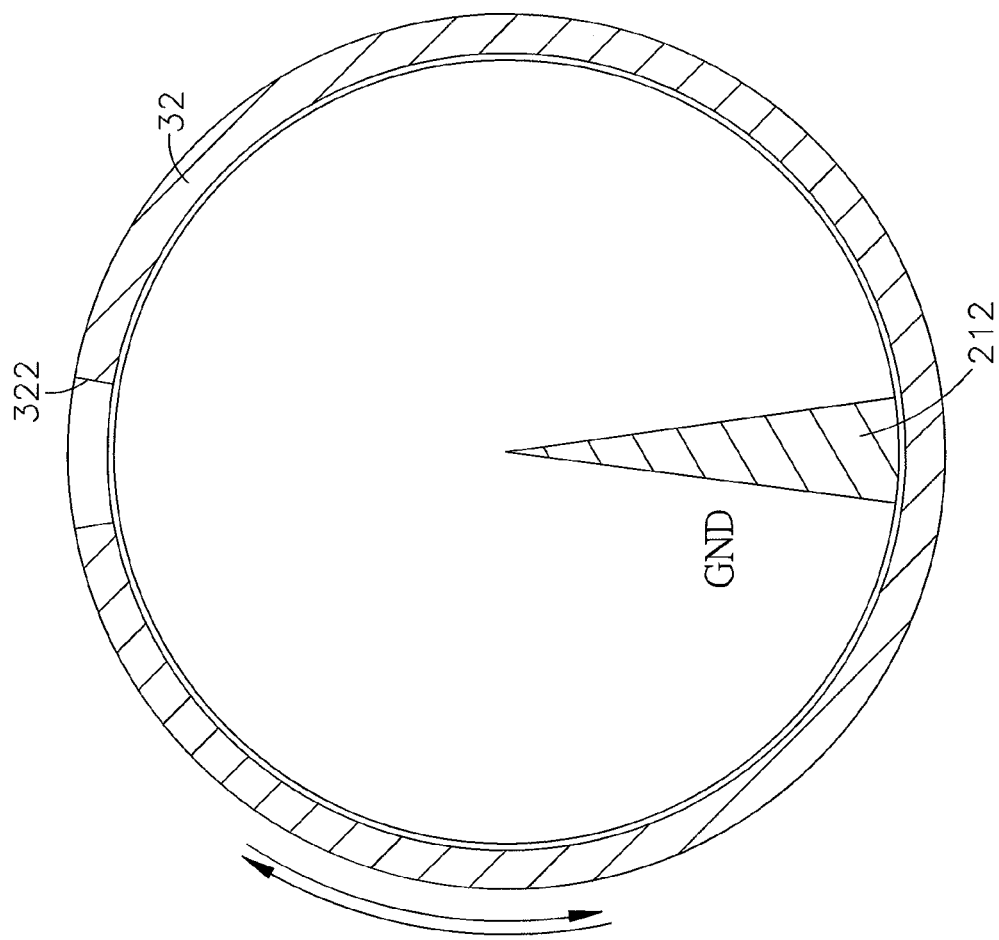

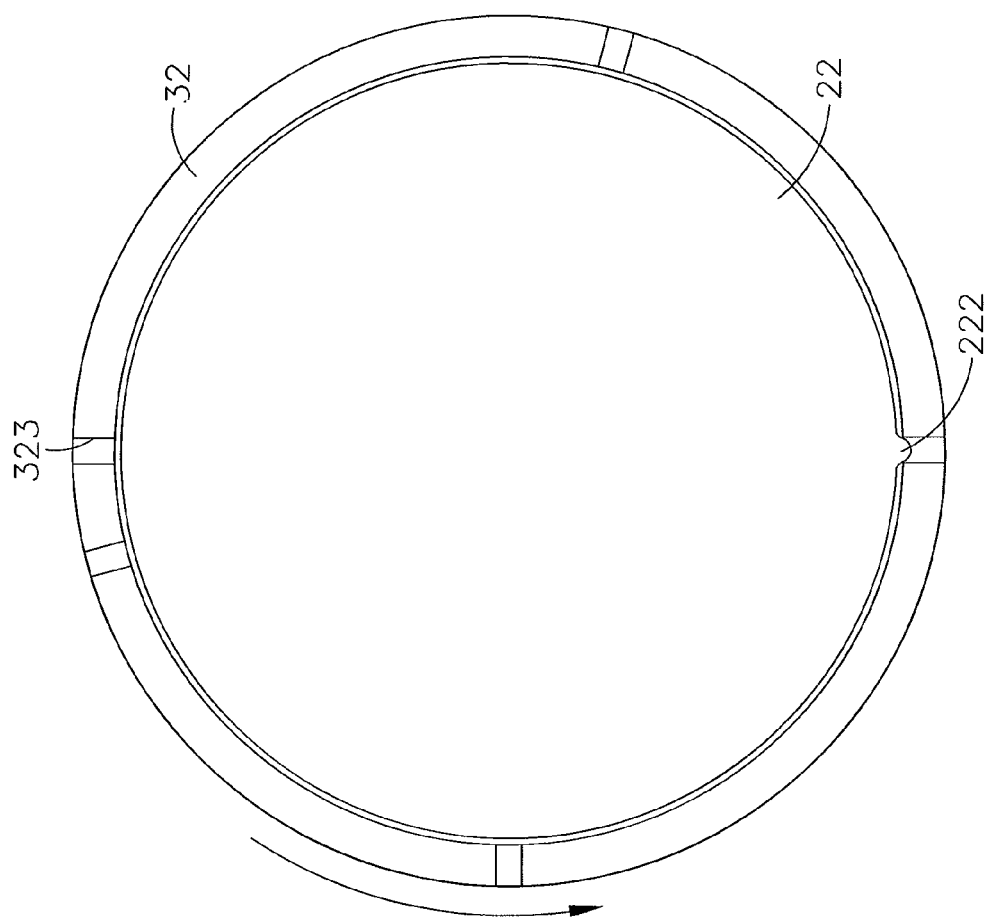

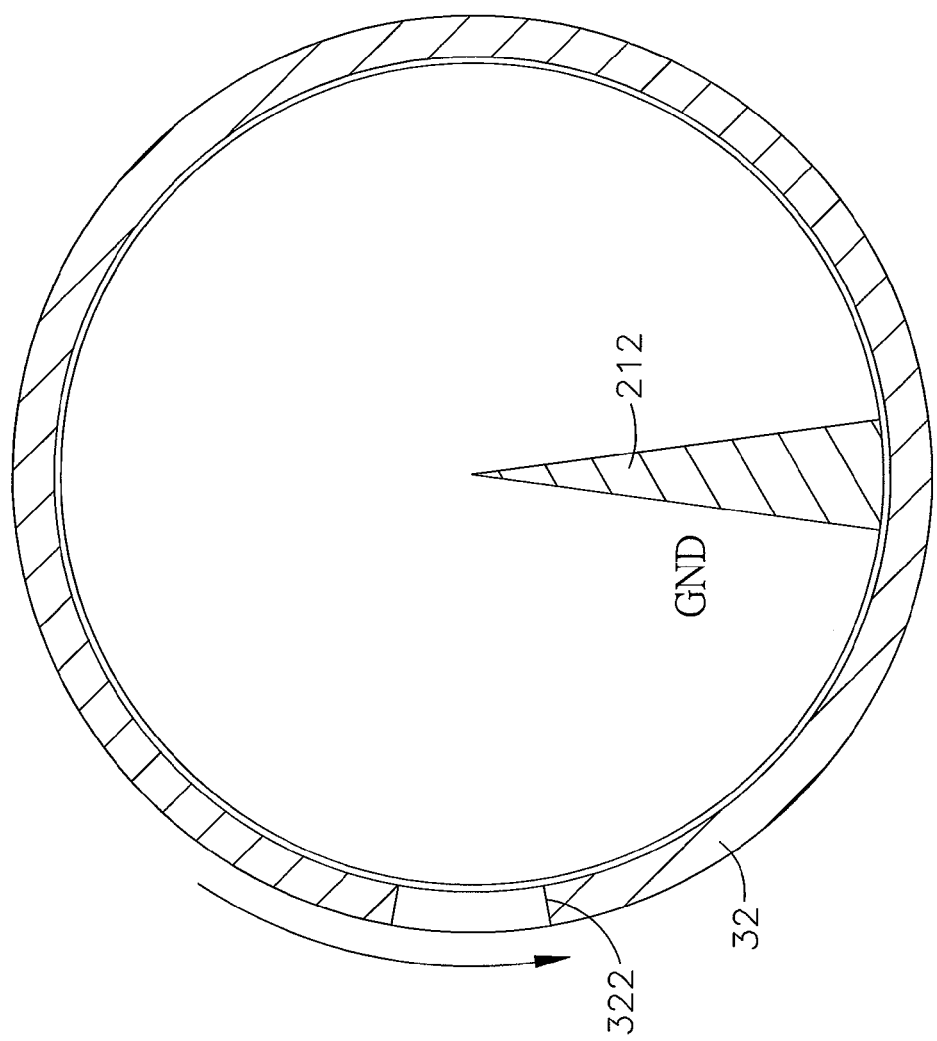

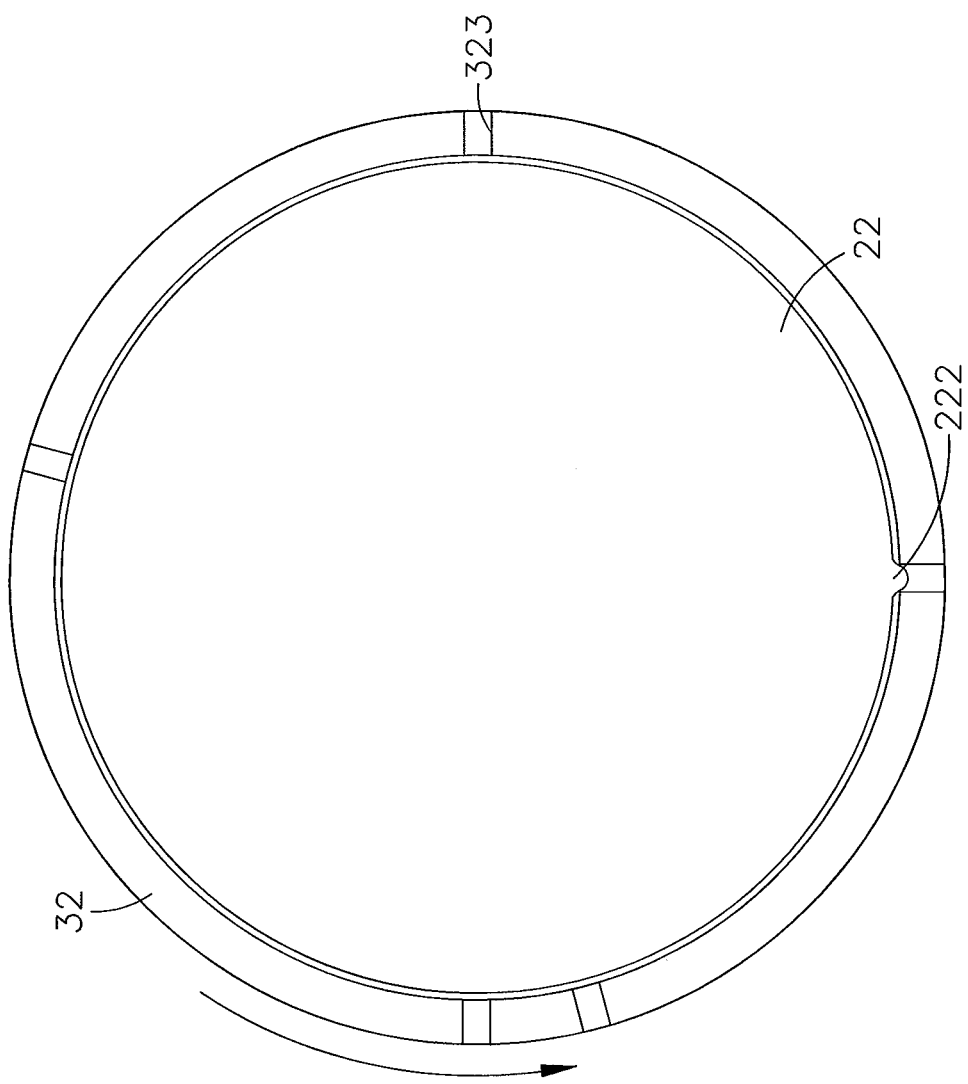

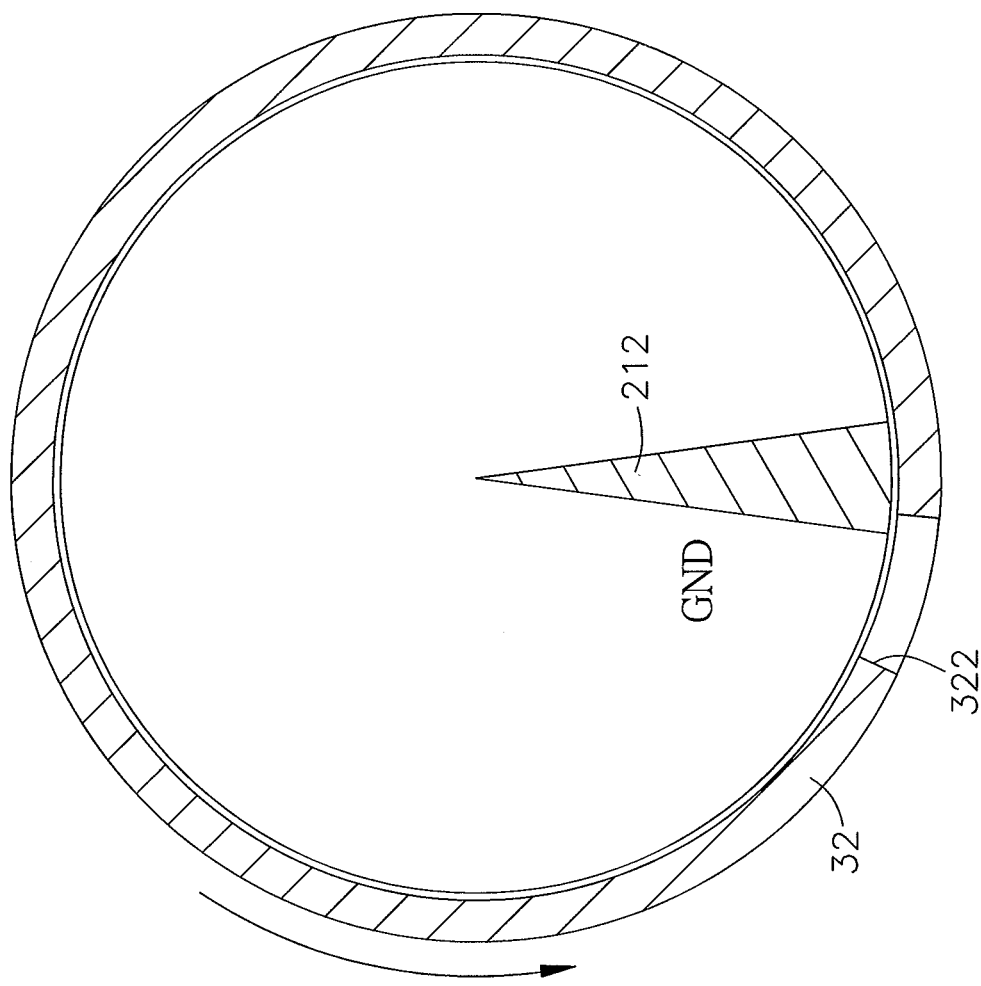

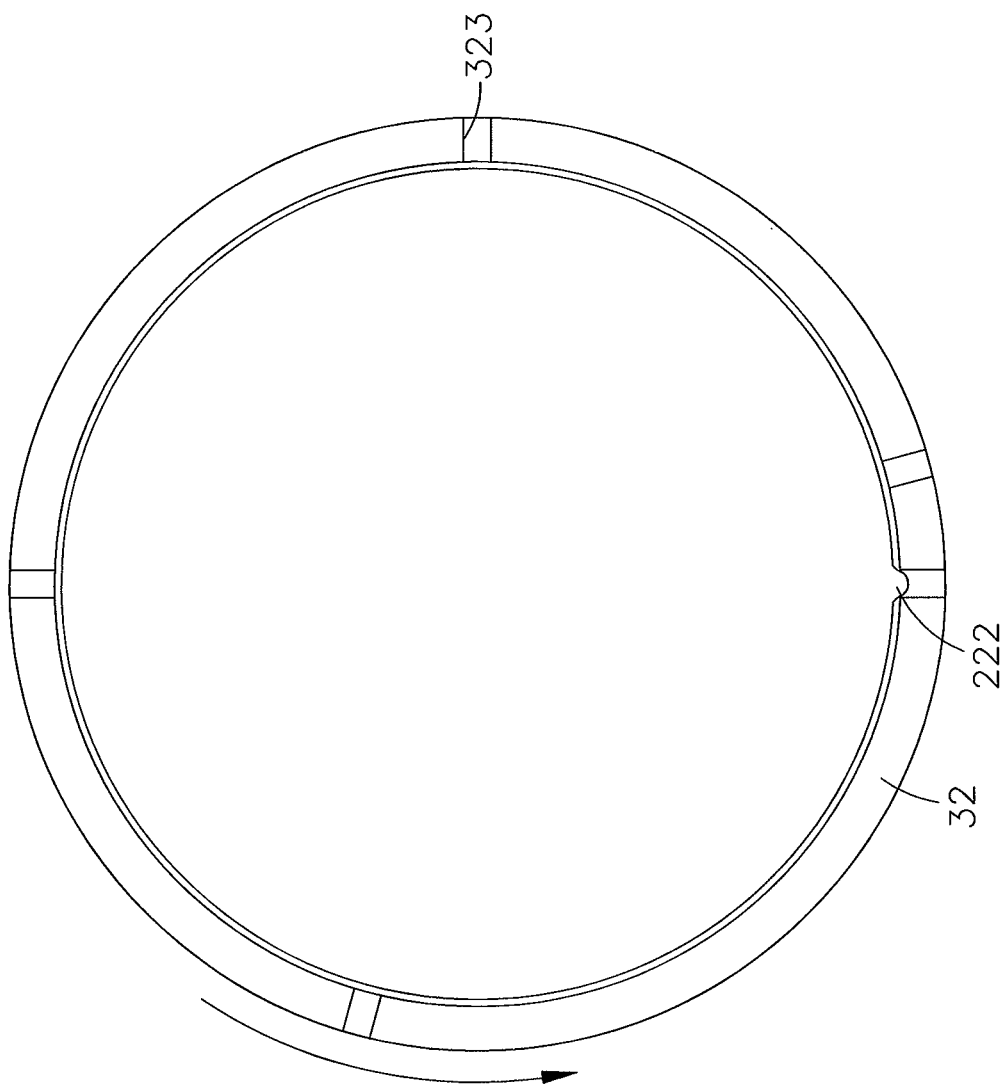

ACTIVE STYLUS WITH SWITCHING FUNCTIONS

This reference is based on Provisional Application Ser. No. 61/928,881, filed on Jan. 17, 2014, currently pending.

BACKGROUND OF THE INVENTION

1. Field of the Invention

The present invention relates to a touch-sensing input device and more particularly, to an active stylus with switching functions, which uses a rotating barrel to switch a control device instead of the use of function keys, preventing from inadvertently touching function keys and improving the convenience of the operation of the active stylus.

2. Description of the Related Art

With fast development of modern technology, various advanced electronic products such as smart phone, touch-screen computers and TVs that have the characteristic of ease of use have been created and appeared on the market. Instead of the use of a keyboard or keypad in a computer or mobile phone for data input, a smart phone, tablet computer, touch screen computer or touch screen TV allows a user to operate it by touching or approaching a software icon on the surface of its touch screen directly with the finger or a stylus.

A stylus may be equipped with multiple function keys for switching by the user to initiate different functional operations, such as color change, clear, switching windows or screenshot, eliminating a complicated clicking procedure and saving much operating time.

However, in order to mate with different versatile designs of advanced electronic products, the number of stylus function keys must be relatively increased. When using a stylus, the user can inadvertently touch the function keys to initiate an undesired functional operation.

Therefore, it is desirable to provide a stylus with switching functions that eliminates the aforesaid problem.

SUMMARY OF THE INVENTION

The present invention has been accomplished under the circumstances in view. It is therefore the main object of the present invention to provide an active stylus with switching functions, which uses a rotating barrel to switch a control device instead of the use of function keys, preventing from inadvertently touching function keys and improving the convenience of the operation of the active stylus.

To achieve this and other objects of the present invention, an active stylus includes a pen body defining therein an accommodation chamber; a control device mounted inside the accommodation chamber, including a circuit board capable of outputting a signal to a touch control device of a touch screen being touched by the active stylus and two first conductors electrically connected to the circuit board; and a rotating barrel rotatably mounted on the pen body around the control device, including a second conductor movable with the rotating barrel relative to the pen body into contact with either or both of the two first conductors, or away from the first conductors, to provide one of a series of signals for driving circuit board to output a corresponding control signal to the touch control device of the touch screen.

BRIEF DESCRIPTION OF THE DRAWINGS

FIG. 8A is a schematic sectional view of the present invention, illustrating a status of the active stylus after the rotating barrel rotated to the first operating position (I).

FIG. 8B is a schematic sectional view of the present invention, illustrating a status of the active stylus after the rotating barrel rotated to the first operating position (II).

FIG. 8C is a schematic sectional view of the present invention, illustrating a status of the active stylus after the rotating barrel rotated to the first operating position (III).

FIG. 10B is a schematic sectional view of the present invention, illustrating a status of the active stylus after the rotating barrel rotated to the second operating position (I).

FIG. 10C is a schematic sectional view of the present invention, illustrating a status of the active stylus after the rotating barrel rotated to the second operating position (I).

FIG. 11B is a schematic sectional view of the present invention, illustrating a status of the active stylus after the rotating barrel rotated to the third operating position (I).

FIG. 12C is a schematic sectional view of the present invention, illustrating a status of the active stylus after the rotating barrel rotated to the fourth operating position (I).

DETAILED DESCRIPTION OF THE PREFERRED EMBODIMENT

Referring to FIGS. 1-7, an active stylus with a switching function in accordance with the present invention is shown. As illustrated, the active stylus comprises a pen body 1, a control device 2, and a rotating barrel 3.

Figure 1:
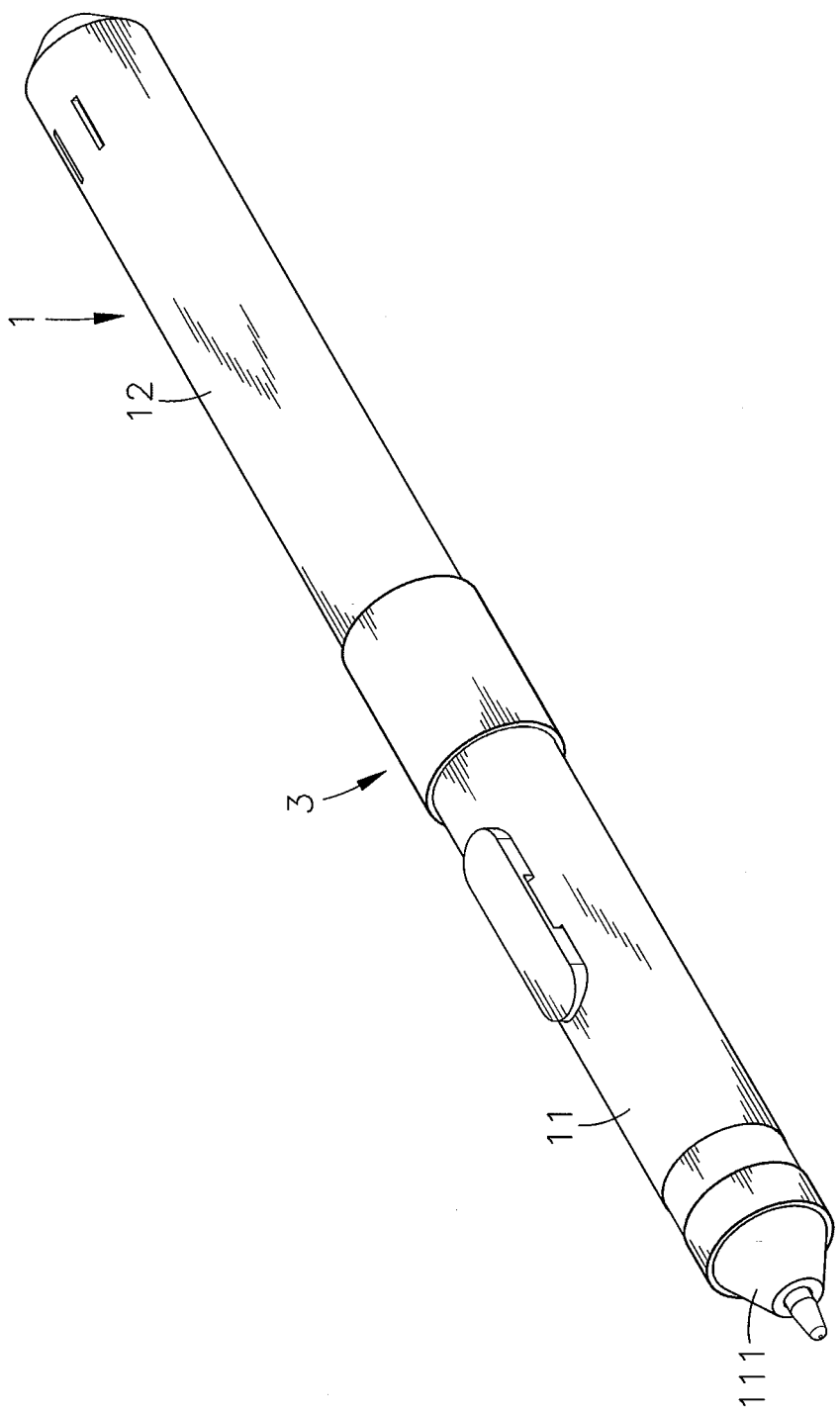
FIG. 1 is an oblique top elevational view of an active stylus in accordance with the present invention.

As illustrated in FIG. 1, the pen body 1 comprises a lower pen holder 11 having a front touch head 111 at a front end thereof, an upper pen holder 12 located at an opposing top end of the lower pen holder 11, and an accommodation chamber 10 defined within the lower pen holder 11 and the upper pen holder 12.

Figure 2:
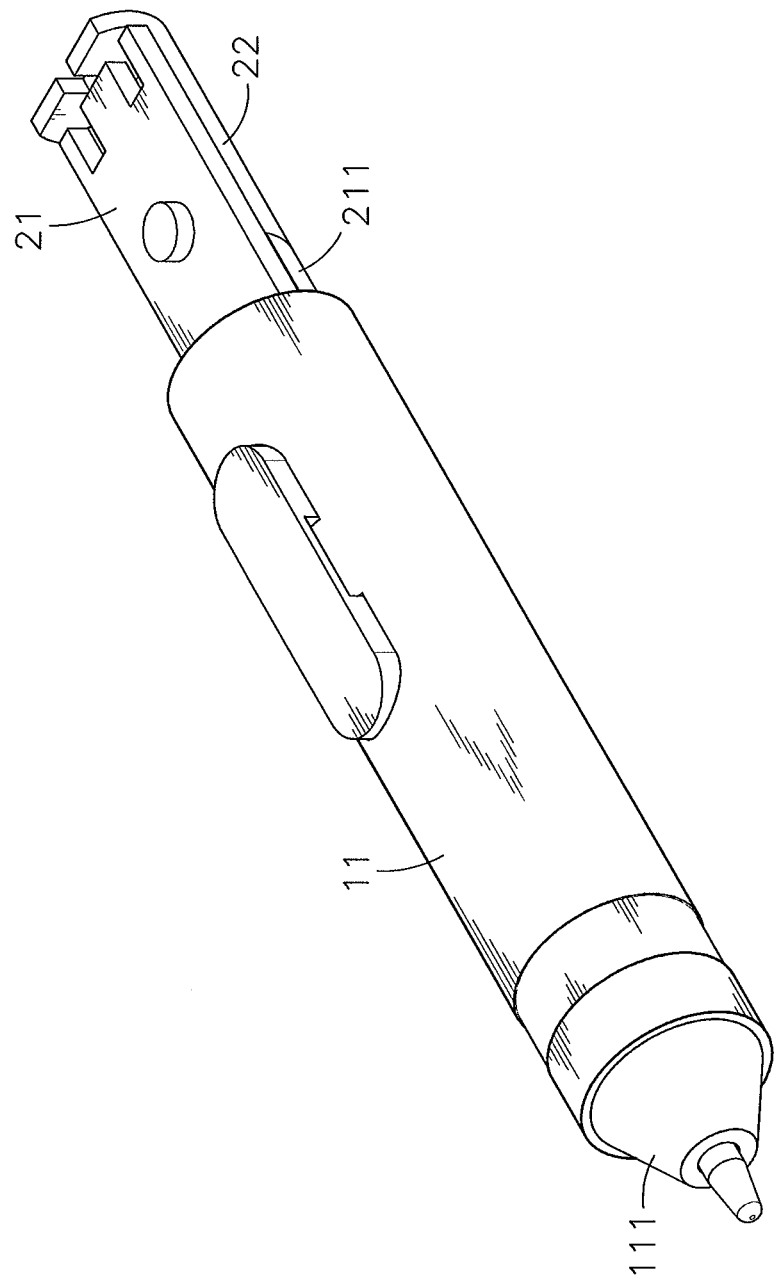
FIG. 2 is an oblique top elevational view of the present invention after removal of the upper pen holder from the pen body.
Figure 3:
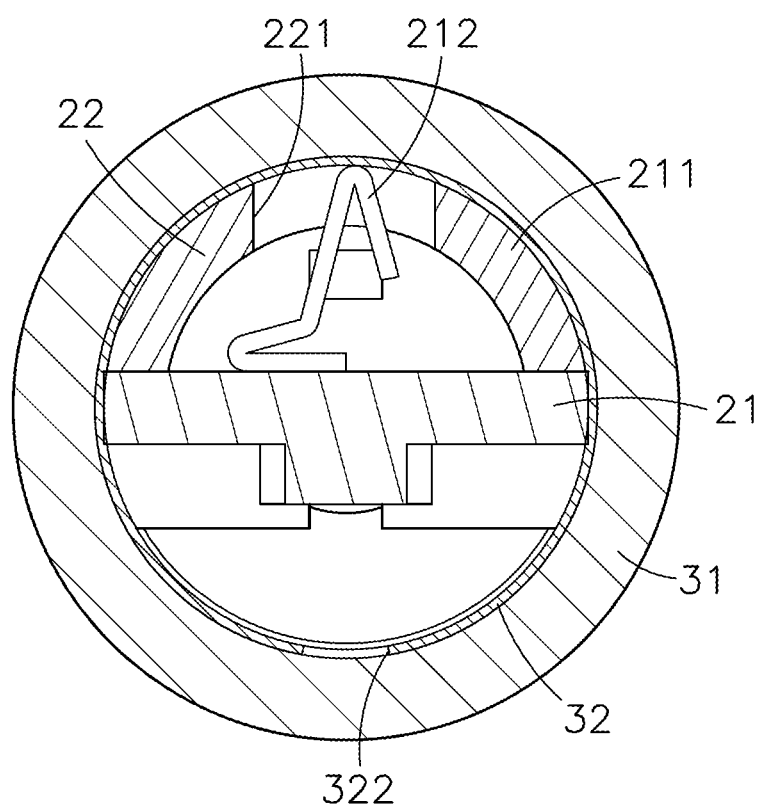
FIG. 3 is a cross-sectional view of the present invention, illustrating the relationship between the control device and the rotating barrel.
Figure 4:
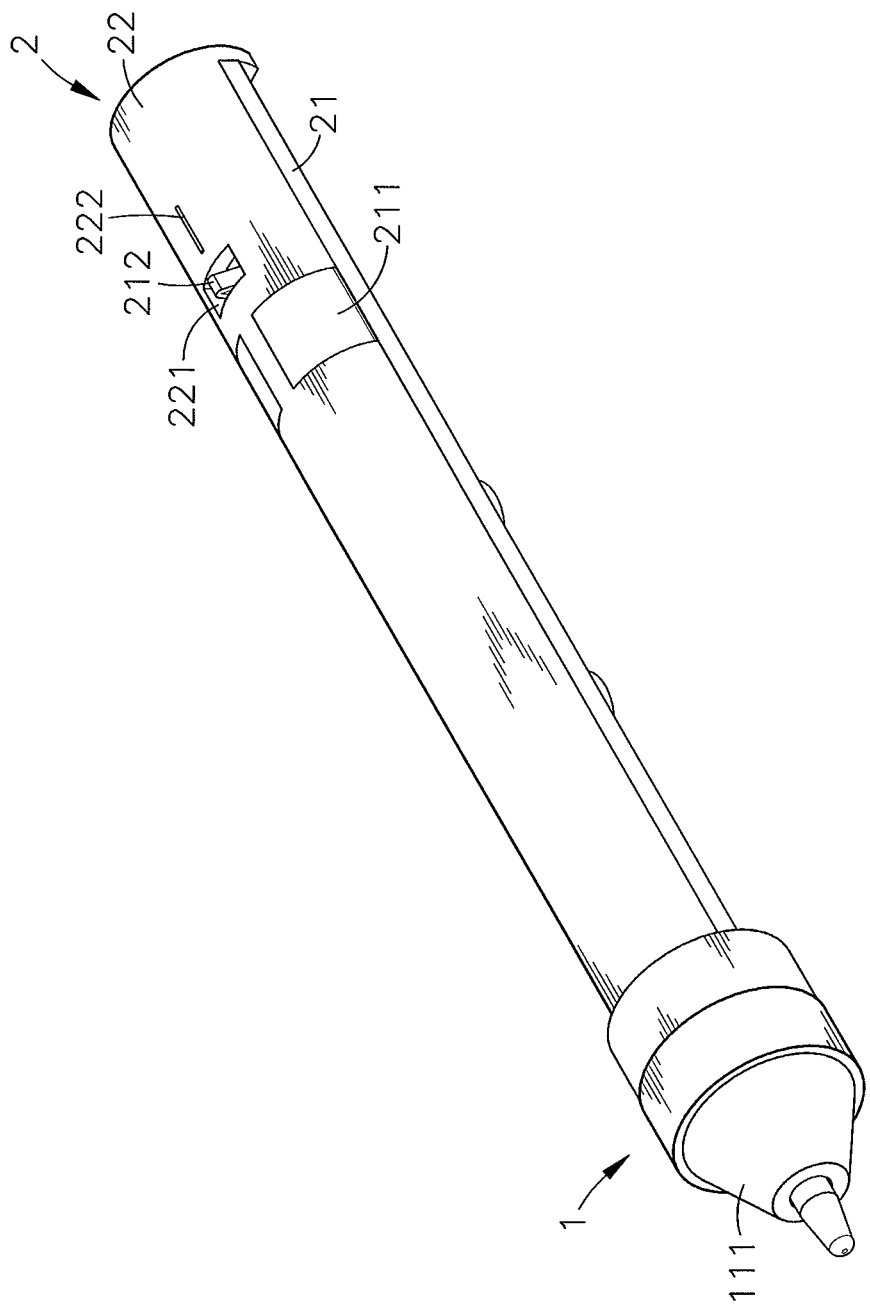
FIG. 4 is an oblique top elevational view of the present invention after removal of the upper pen holder from the pen body when viewed from the bottom side.

As illustrated in FIGS. 2, 3 and 4, the control device 2 comprises a circuit board 21, and a hollow semi-cylindrical insulator 22 located at a back side of the circuit board 21. The circuit board 21 comprises two first conductors 211 bilaterally arranged at the back side thereof in a transversely spaced manner and respectively exposed out of the hollow semi-cylindrical insulator 22, and a conductive shrapnel 212 located at a rear side relative to the first conductors 211 and grounded. The hollow semi-cylindrical insulator 22 comprises a through hole 221 that receives a part of the conductive shrapnel 212, and a positioning rib 222 located at a rear side relative to the through hole 221.

Figure 5:
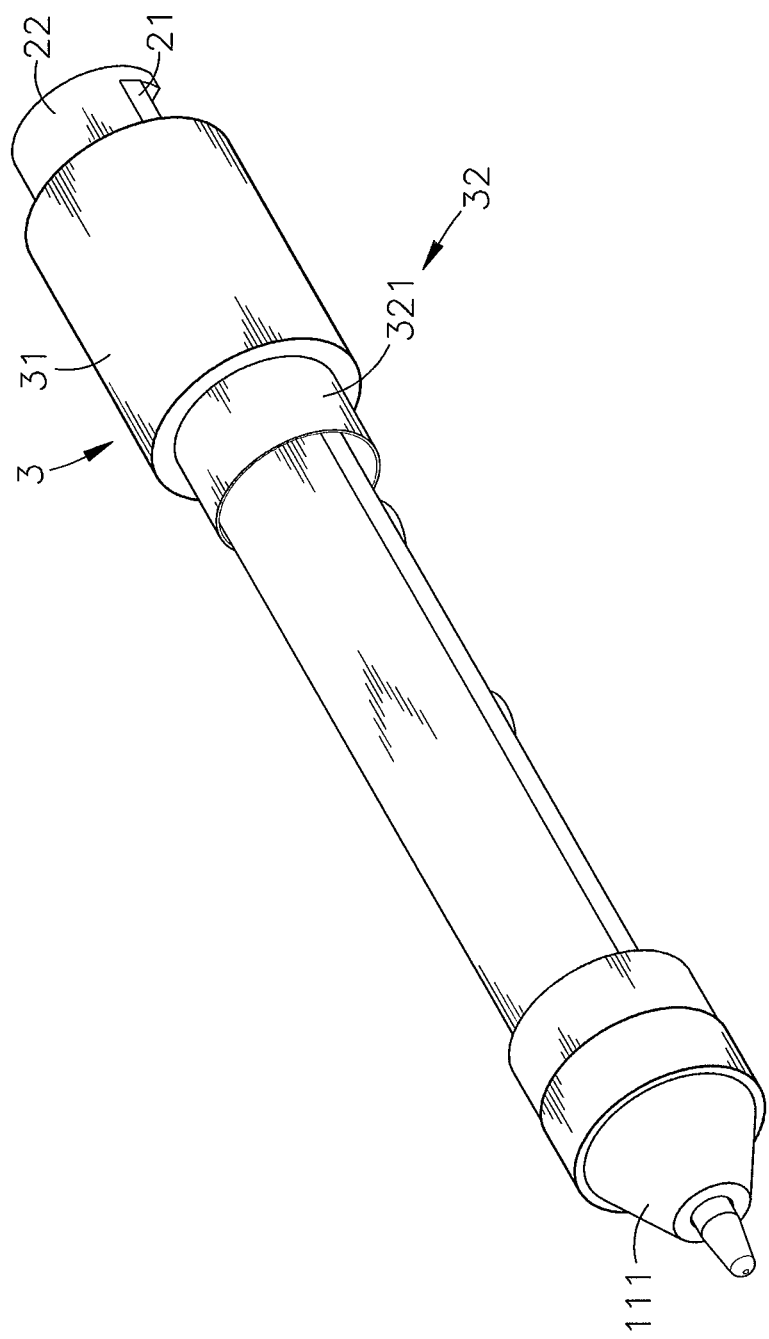
FIG. 5 is an oblique top elevational view of the present invention after removal of the upper pen holder and lower pen holder from the active stylus.
Figure 6:
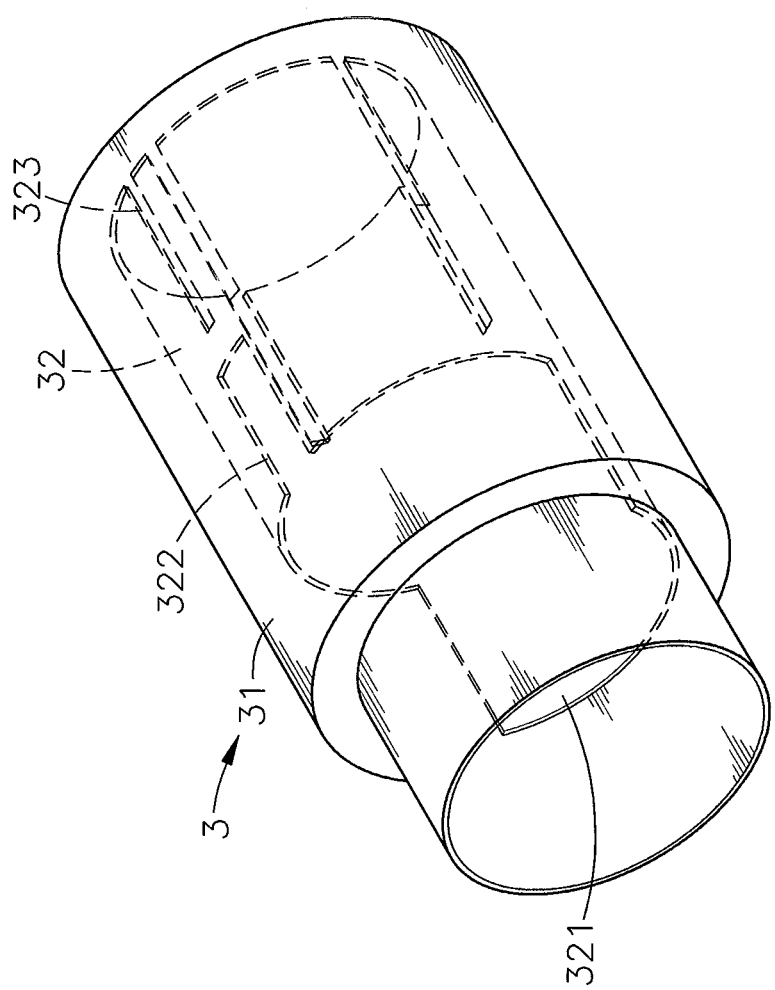
FIG. 6 is a perspective view of the rotating barrel in accordance with the present invention.
Figure 7:
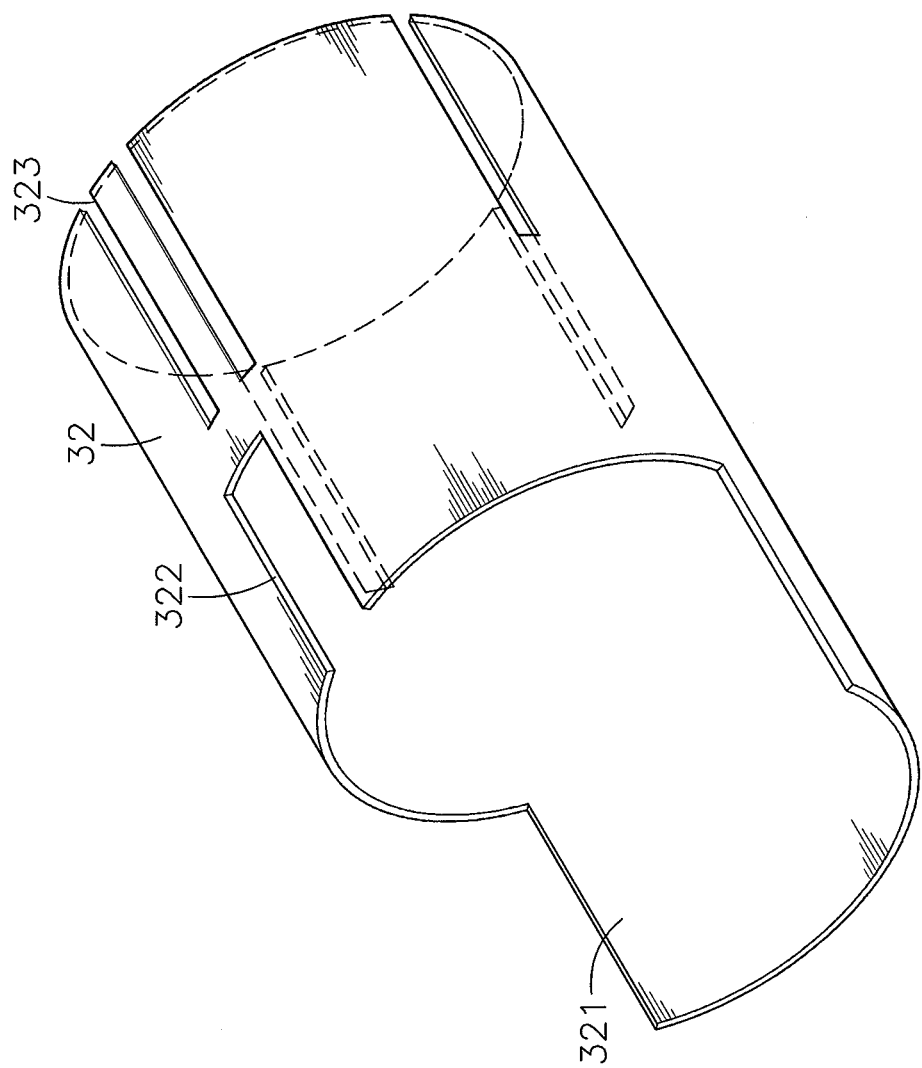
FIG. 7 is a perspective view of the inner metal barrel member of the rotating barrel in accordance with the present invention.

As illustrated in FIGS. 5 and 6, the rotating barrel 3 comprises an outer insulative barrel member 31, and an inner metal barrel member 32 located in the outer insulative barrel member 31. As illustrated in FIG. 7, the inner metal barrel member 32 comprises a semicircular second conductor 321 forwardly extended from a lower part of a circular front edge thereof, a front locating slot 322 longitudinally cut through an opposing upper part of the peripheral wall thereof and equally spaced between two opposite lateral sides of the semicircular second conductor 321, and a plurality of rear positioning slots 323 longitudinally cut through the peripheral wall thereof and extending to an opposing circular rear edge thereof.

In installation, mount the control device 2 in the accommodation chamber 10 of the pen body 1, and sleeve the rotating barrel 3 onto the pen body 1 to attach the inner metal barrel member 32 to the periphery of the hollow semi-cylindrical insulator 22 of the control device 2. Thus, the pen body 1, the control device 2 and the rotating barrel 3 are assembled, constituting the active stylus.

It is to be understood that installing the control device 2 in the accommodation chamber of the pen body 1 is simply an example of the invention, but not intended to limit the scope of the invention. Alternatively, the control device 2 can be installed in the lower pen holder 11, the upper pen holder 12, or any other part of the pen body 1.

Further, the hollow semi-cylindrical shape of the insulator 22 of the control device 2 is simply an example of the invention, but not intended to limit the scope of the invention. Polygonal shape or any other irregular shape can be selected as an alternation. Further, the inner metal barrel member 32 of the rotating barrel 3 can be directly attached to the first conductors 211, eliminating the use of the hollow semi-cylindrical insulator 22 without departing from the spirit and scope of the invention.

Figure 9:
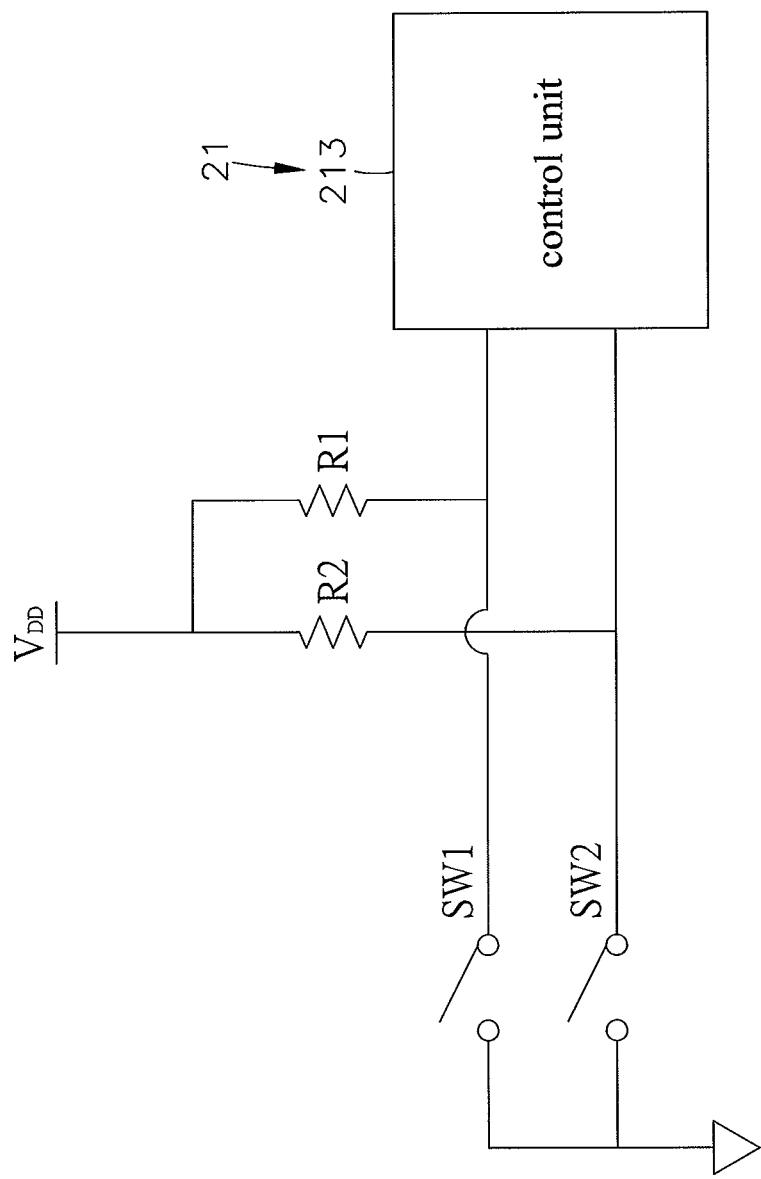
FIG. 9 is an equivalent circuit diagram of the control device and rotating barrel of the active stylus in accordance with the present invention.

Referring to FIG. 9 and FIGS. 4 and 6 again, the circuit board 21 comprises a voltage source $V_{DD}$, a plurality of resistors R1;R2 corresponding to the first conductors 211, and a control unit 213. The voltage source $V_{DD}$ is electrically connected to respective one ends of the resistors R1;R2. The opposite ends of the resistors R1;R2 are respectively electrically connected to the first conductors 211 that are then electrically coupled to the control unit 213. The left-sided first conductor 211 is adapted for contacting the semicircular second conductor 321 to switch on a first switch SW1. The right-sided first conductor 211 is adapted for contacting the semicircular second conductor 321 to switch on a second switch SW2.

Referring to FIGS. 8A, 8B and 8C, the invention is applicable to a capacitive stylus as well as a resistive stylus. In actual application, attach the front touch head 111 of the lower pen holder 11 to the surface of the touch screen, and then rotate the rotating barrel 3 to a first operating position to have the positioning rib 222 of the hollow semi-cylindrical insulator 22 of the control device 2 be positioned in one rear positioning slot 323 of the rotating barrel 3 (see FIG. 8C). At this time, the inner metal barrel member 32 is attached to the conductive shrapnel 212 that is grounded (see FIG. 8B), and therefore the circuit of the circuit board 21 forms an operating loop to turn on the power supply. Further, the semicircular second conductor 321 of the inner metal barrel member 32 simultaneously touches the two first conductors 211 (see FIG. 8A), therefore, the first switch SW1 and the second switch SW2 are electrically conducted (closed circuit), enabling the voltage source $V_{DD}$ to provide a first signal combination (0,0) through the resistors R1;R2 to the control unit 213. At this time, the control unit 213 provides a first signal to the touch control device, enabling the front touch head 111 of the lower pen holder 11 to operate the touch screen in executing the function of, for example, color change, clear, switching windows, or screenshot.

Figure 10A:
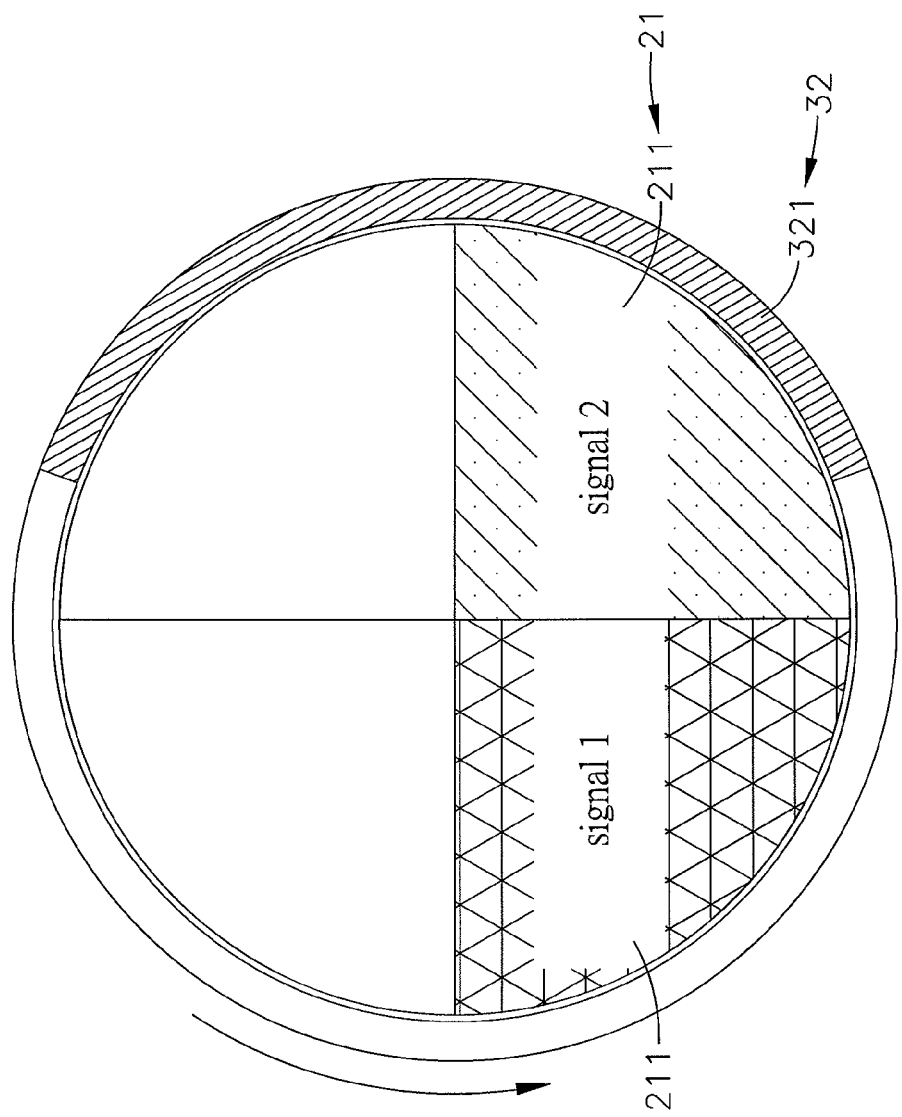
FIG. 10A is a schematic sectional view of the present invention, illustrating a status of the active stylus after the rotating barrel rotated to the second operating position (I).

Referring to FIGS. 10A, 10B and 10C, when rotating the rotating barrel 3 in the clockwise direction through 90° to a second operating position to have the positioning rib 222 of the hollow semi-cylindrical insulator 22 of the control device 2 be positioned in another rear positioning slot 323 of the rotating barrel 3 (see FIG. 10C). At this time, the inner metal barrel member 32 is attached to the conductive shrapnel 212 that is grounded (see FIG. 10B), and therefore the circuit of the circuit board 21 forms an operating loop to turn on the power supply. Further, the semicircular second conductor 321 of the inner metal barrel member 32 simply touches the right-sided first conductor 211 (see FIG. 10A), therefore, the first switch SW1 is electrically disconducted (open circuit) and the second switch SW2 is electrically conducted (closed circuit), enabling the voltage source $V_{DD}$ to provide a second signal combination (1,0) through the resistors R1;R2 to the control unit 213. At this time, the control unit 213 provides a second signal to the touch control device, enabling the front touch head 111 of the lower pen holder 11 to operate a touch control on the touch screen.

Figure 11A:
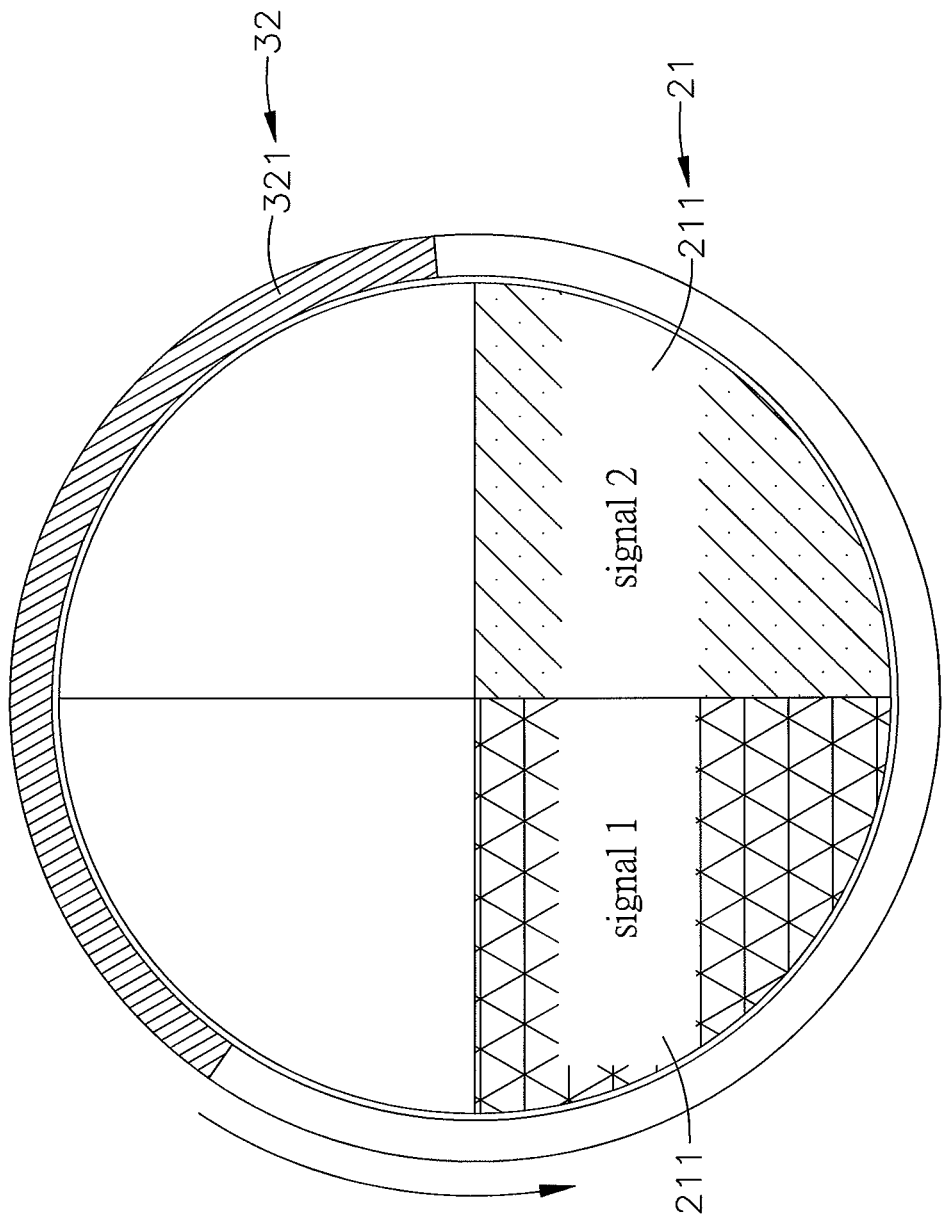
FIG. 11A is a schematic sectional view of the present invention, illustrating a status of the active stylus after the rotating barrel rotated to the third operating position (I).
Figure 11C:
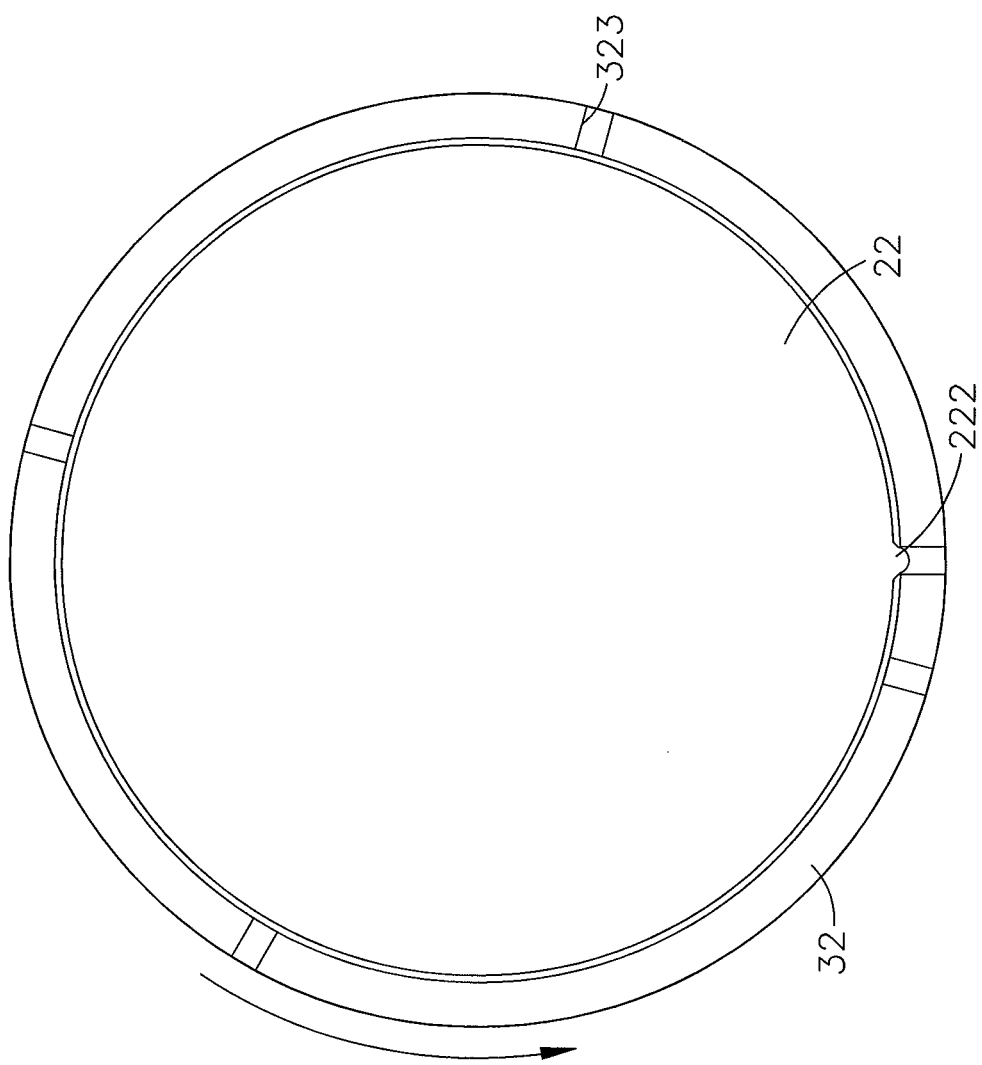
FIG. 11C is a schematic sectional view of the present invention, illustrating a status of the active stylus after the rotating barrel rotated to the third operating position (I).

Referring to FIGS. 11A, 11B and 11C, when rotating the rotating barrel 3 in the counter-clockwise direction through 75° from the first position to a third operating position to have the positioning rib 222 of the hollow semi-cylindrical insulator 22 of the control device 2 be positioned in another rear positioning slot 323 of the rotating barrel 3 (see FIG. 11C). At this time, the inner metal barrel member 32 is attached to the conductive shrapnel 212 that is grounded (see FIG. 11B), and therefore the circuit of the circuit board 21 forms an operating loop to turn on the power supply. Further, the semicircular second conductor 321 of the inner metal barrel member 32 is kept away from the first conductors 211 (see FIG. 11A), therefore, the first switch SW1 and the second switch SW2 are electrically disconducted (open circuit), enabling the voltage source $V_{DD}$ to provide a third signal combination (1,1) through the resistors R1;R2 to the control unit 213. At this time, the control unit 213 provides a third signal to the touch control device, enabling the front touch head 111 of the lower pen holder 11 to operate a touch control on the touch screen.

Figure 12A:
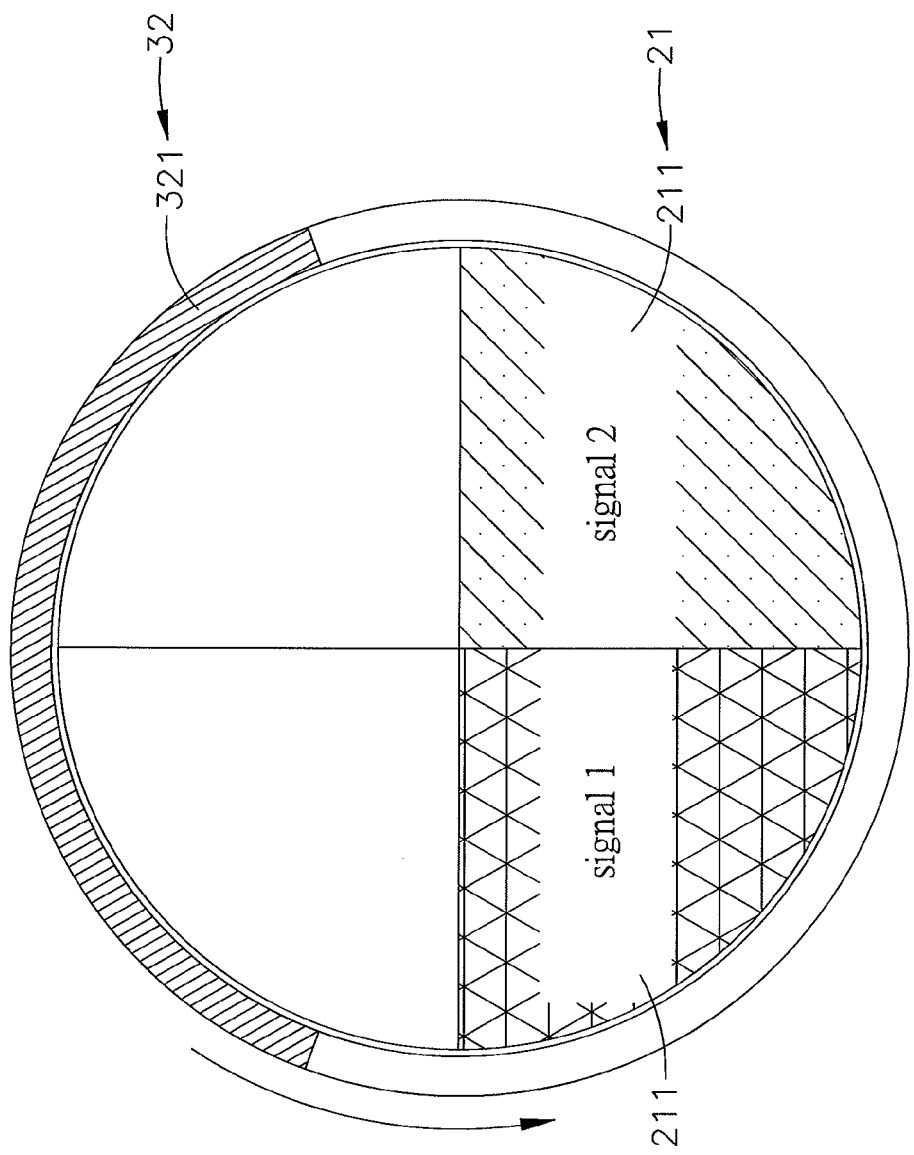
FIG. 12A is a schematic sectional view of the present invention, illustrating a status of the active stylus after the rotating barrel rotated to the fourth operating position (I).
Figure 12B:
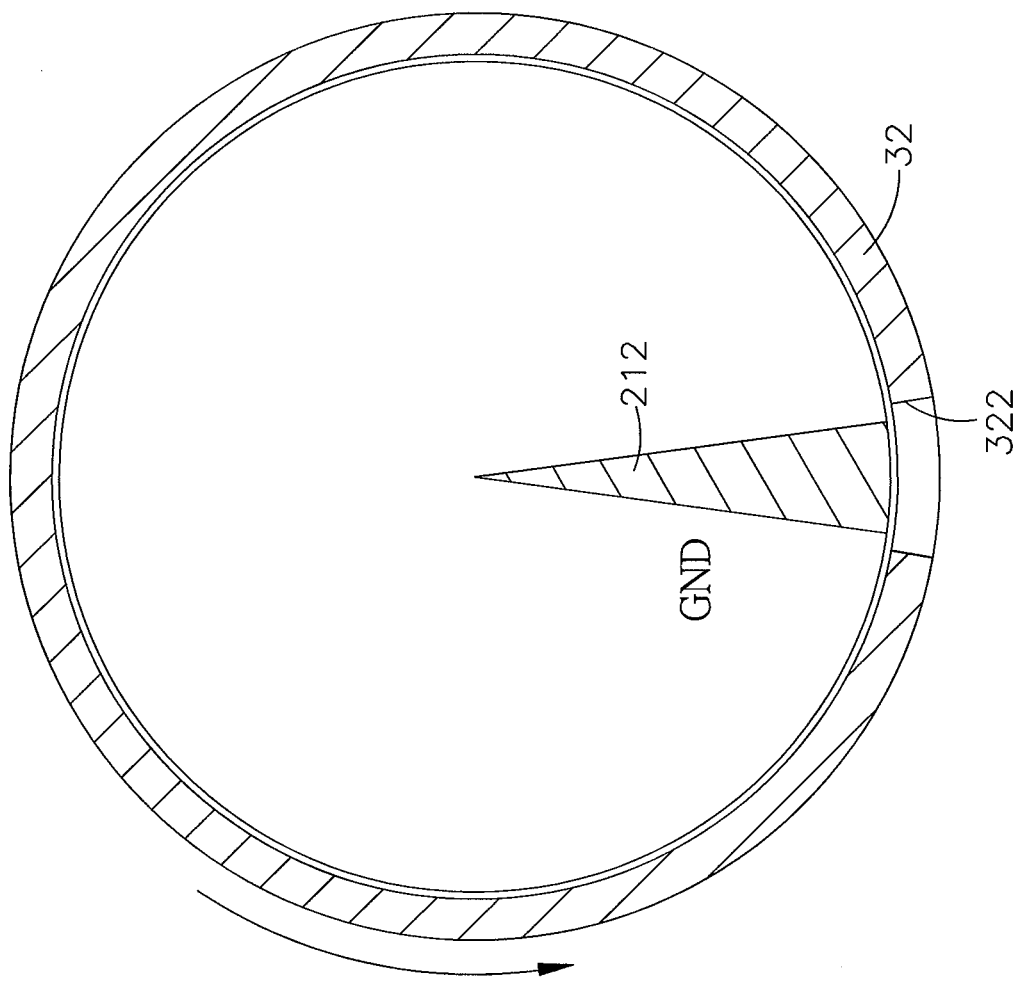
FIG. 12B is a schematic sectional view of the present invention, illustrating a status of the active stylus after the rotating barrel rotated to the fourth operating position (I).

Referring to FIGS. 12A, 12B and 12C, when rotating the rotating barrel 3 in the clockwise direction through 15° from the third position to a fourth operating position to have the positioning rib 222 of the hollow semi-cylindrical insulator 22 of the control device 2 be positioned in another rear positioning slot 323 of the rotating barrel 3 (see FIG. 12C). At this time, the conductive shrapnel 212 of the circuit board 21 is positioned in the front locating slot 322 of the inner metal barrel member 32 without contacting the inner metal barrel member 32 (see FIG. 12B), and therefore the circuit of the circuit board 21 is off.

Figure 13A:
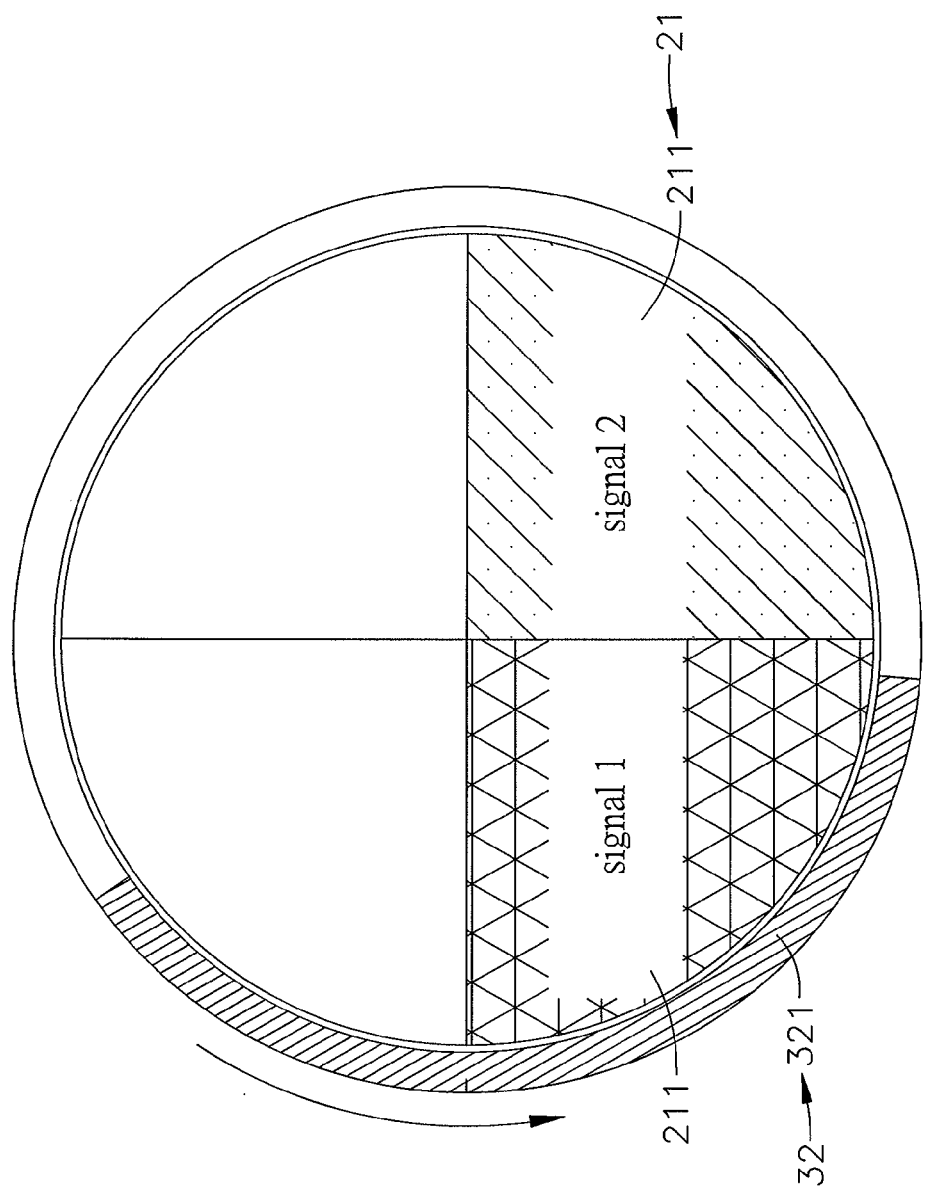
FIG. 13A is a schematic sectional view of the present invention, illustrating a status of the active stylus after the rotating barrel rotated to the fifth operating position (I).
Figure 13B:
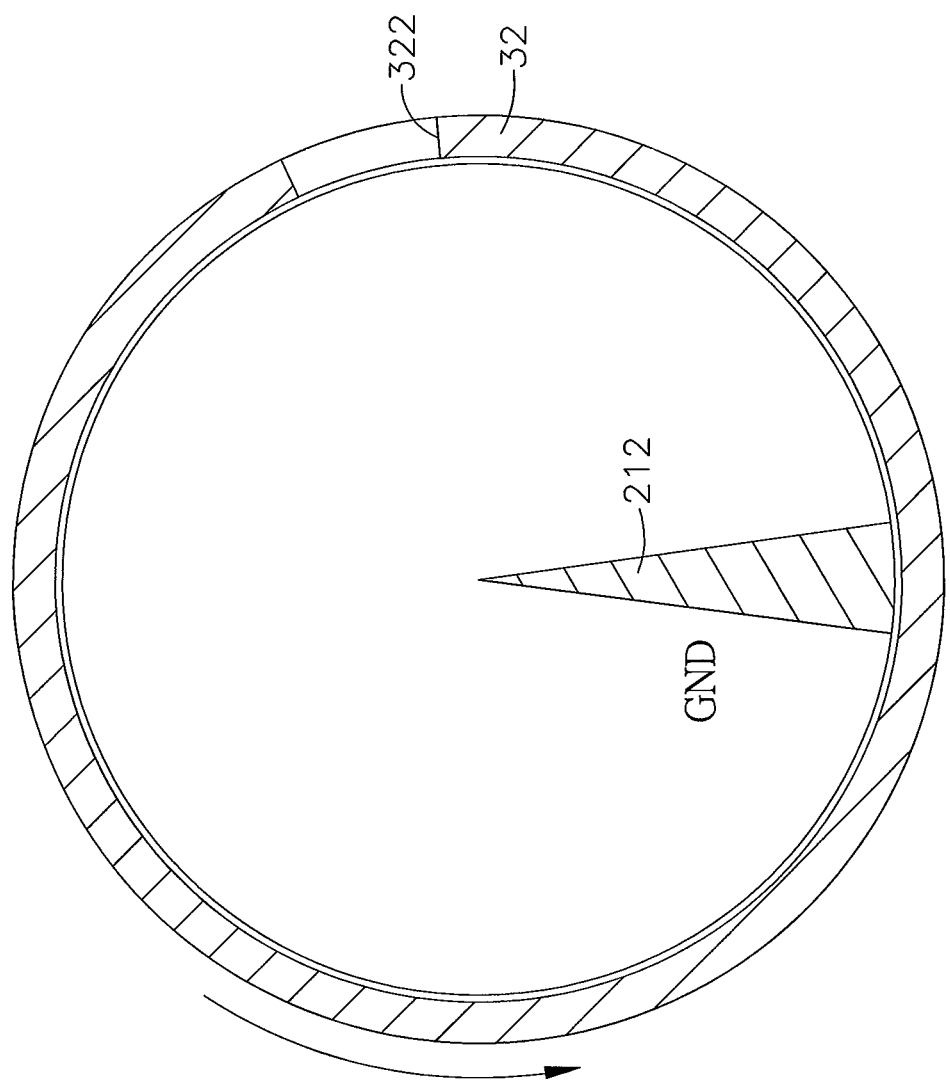
FIG. 13B is a schematic sectional view of the present invention, illustrating a status of the active stylus after the rotating barrel rotated to the fifth operating position (I).
Figure 13C:
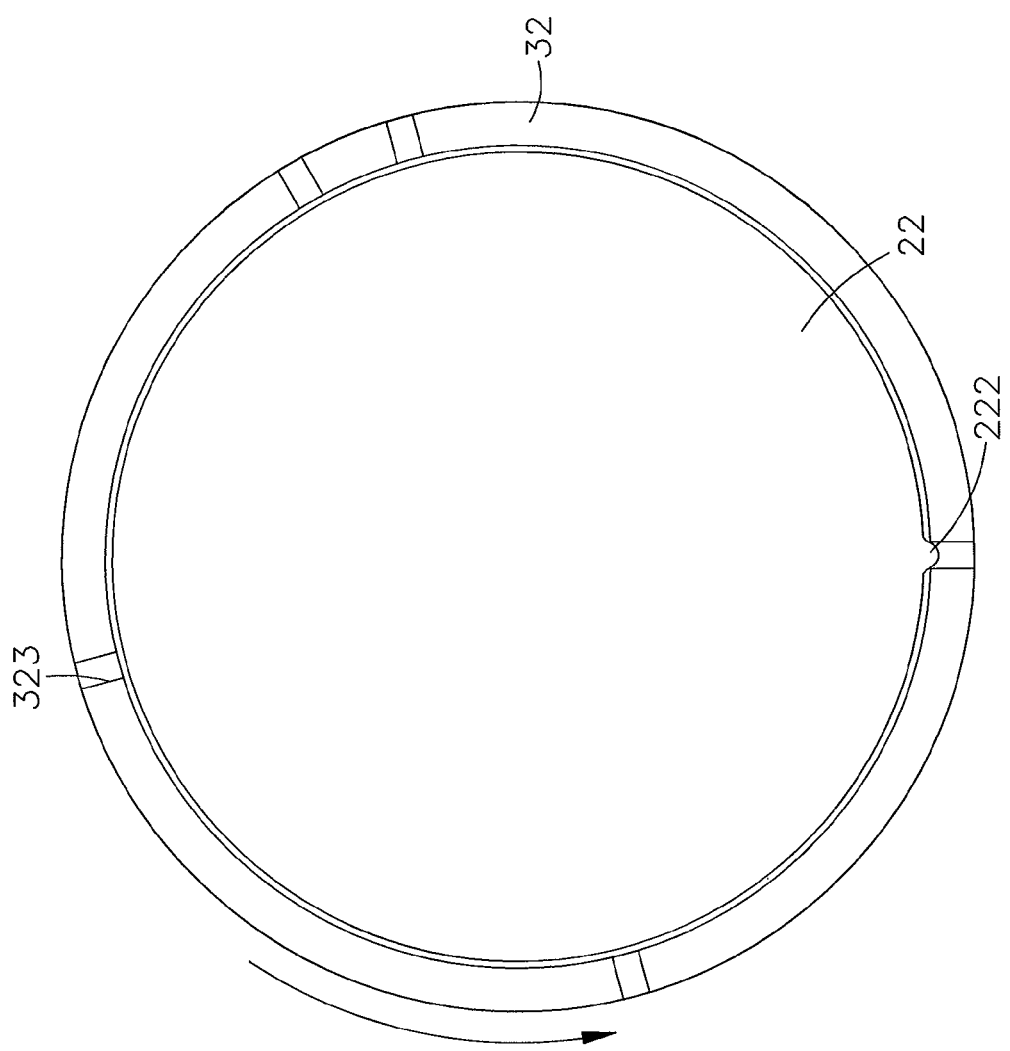
FIG. 13C is a schematic sectional view of the present invention, illustrating a status of the active stylus after the rotating barrel rotated to the fifth operating position (I).

Referring to FIGS. 13A, 13B and 13C, when rotating the rotating barrel 3 in the counter-clockwise direction through 105° from the first position to a fifth operating position to have the positioning rib 222 of the hollow semi-cylindrical insulator 22 of the control device 2 be positioned in another rear positioning slot 323 of the rotating barrel 3 (see FIG. 13C). At this time, the inner metal barrel member 32 is attached to the conductive shrapnel 212 that is grounded (see FIG. 13B), and therefore the circuit of the circuit board 21 forms an operating loop to turn on the power supply. Further, the semicircular second conductor 321 of the inner metal barrel member 32 simply touches the left-sided the first conductor 211 (see FIG. 13A), therefore, the first switch SW1 is electrically conducted (close circuit) and the second switch SW2 is electrically disconducted (open circuit), enabling the voltage source $V_{DD}$ to provide a fourth signal combination (0,1) through the resistors R1;R2 to the control unit 213. At this time, the control unit 213 provides a fourth signal to the touch control device, enabling the front touch head 111 of the lower pen holder 11 to operate a touch control on the touch screen.

In the above-described embodiment, the rotating angles of the rotating barrel 3 are simply examples of the invention, but not intended to limit the scope of the invention. In actual application, the arrangement of the control device 2 and the internal components inside the rotating barrel 3 can be relatively changed subject to the size of the active stylus or its touch control functions so as to further alter the rotating angles of the rotating barrel 3 relative to the control device 2.

Further, the arrangement of the two transversely aligned first conductors 211 is simply example of the invention, but not intended to limit the scope of the invention. Alternatively, the control device 2 can be made having simply one first conductor 211, or more than two first conductors 211; the rotating barrel 3 can be made having multiple second conductors 321 to work with the at least one first conductor 211 of the control device 2 in generating one of a series of signals to the control unit 213 for a different functional control.

By rotating the rotating barrel 3 relative to the control device 2 to move the second conductor 321 into contact with either or all of the first conductors 211, or not into contact with any first conductor 211, one of a series of input signals is provided to the control unit 213, enabling the control unit 213 to provide a specific control signal to the touch control device to switch between different touch-control operating functions. This design eliminates the arrangement of any function keys, preventing from inadvertently touching function keys and improving the convenience of the operation of the active stylus.

In conclusion, the active stylus of the present invention is characterized in that rotating the rotating barrel 3 to move the second conductor 321 into contact with either or all of the first conductors 211, or not into contact with any first conductors 211, can drive the circuit board 21 to output one of a series of signals to the touch control device, switching the functional operation of the active stylus on the touch screen.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An active stylus, comprising:
   a pen body defining therein an accommodation chamber
   a control device mounted inside the accommodation chamber, the control device comprising a circuit board capable of outputting a signal to a touch control device of a touch screen being touched by the active stylus, and at least one first conductor electrically connected to the circuit board; and
   a rotating barrel rotatably mounted on the pen body around the control device, the rotating barrel comprising at least one second conductor movable with the rotating barrel relative to the pen body into contact with at least one of the at least one first conductor or away from the at least one first conductor to provide one of a series of signals for driving the circuit board to output a corresponding control signal to the touch control device of the touch screen,
   wherein the control device further comprises a hollow semi-cylindrical insulator located at a back side of the circuit board,
   wherein the at least one first conductor is arranged at a back side of the circuit board and exposed out of the hollow semi-cylindrical insulator,
   wherein the rotating barrel comprises an outer insulative barrel member and an inner metal barrel member located in the outer insulative barrel member, and
   wherein the at least one second conductor is forwardly extended from a circular front edge of the inner metal barrel member.

2. The active stylus as claimed in claim 1, wherein the pen body comprises a lower pen holder, the lower pen holder comprising a front touch head located at a front end thereof for touching the touch screen, an upper pen holder located at an opposing top end of the lower pen holder, and the accommodation chamber that is defined within the lower pen holder and the upper pen holder; the at least one first conductor extends out of the pen body between the lower pen holder and the upper pen holder.

3. The active stylus as claimed in claim 1, wherein the control device further comprises a conductive shrapnel located at a rear side relative to the at least one first conductor and grounded and pressable by the inner metal barrel member to electrically conduct the circuit board; the hollow semi-cylindrical insulator comprises a through hole for the passing of a part of the conductive shrapnel; the inner metal barrel member comprises a front locating slot longitudinally cut through an opposing upper part of the peripheral wall thereof for receiving the conductive shrapnel to hold the circuit board in non-conducting state.

4. The active stylus as claimed in claim 1, wherein the hollow semi-cylindrical insulator further comprises a positioning rib located at a rear side relative to the through hole thereof; the inner metal barrel member further comprises a plurality of rear positioning slots longitudinally cut through the peripheral wall thereof and extending to an opposing circular rear edge thereof for selectively receiving the positioning rib of the hollow semi-cylindrical insulator to lock the rotating barrel to the control device.

5. The active stylus as claimed in claim 1, wherein the circuit board comprises a voltage source, at least one resistor corresponding to the at least one first conductor and a control unit, the voltage source being electrically connected to one end of each the resistor, each the resistor having an opposite end thereof electrically connected to one respective the first conductor that is electrically coupled to the control unit, each the first conductor being adapted for contacting one the second conductor to constitute a respective switch.

6. The active stylus as claimed in claim 1, wherein the number of the at least one first conductor of the control device is 2, and these two the first conductors are bilaterally arranged at a back side of the circuit board in a transversely spaced manner; the number of the at least one second conductor of the rotating member is 1, and this second conductor is movable with the rotating member relative to the control device between a first position where the second conductor touches one left-sided the first conductor to produce a first signal, a second position where the second conductor touches one right-sided the first conductor to produce a second signal, a third position where the second conductor is kept apart from the two first conductors to produce a third signal, and a fourth position where the second conductor touches the two first conductors to produce a fourth signal.

* * * * *